US011546859B2

(12) United States Patent
Ryu et al.

(10) Patent No.: US 11,546,859 B2
(45) Date of Patent: Jan. 3, 2023

(54) INTERFERENCE CONTROL FOR UPLINK TRANSMISSION

(71) Applicant: QUALCOMM Incorporated, San Diego, CA (US)

(72) Inventors: Jung Ho Ryu, Fort Lee, NJ (US); Tianyang Bai, Bridgewater, NJ (US); Kiran Venugopal, Raritan, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/709,288

(22) Filed: Dec. 10, 2019

(65) Prior Publication Data

US 2020/0196246 A1 Jun. 18, 2020

Related U.S. Application Data

(60) Provisional application No. 62/780,825, filed on Dec. 17, 2018.

(51) Int. Cl.
*H04W 52/08* (2009.01)
*H04W 52/14* (2009.01)
(Continued)

(52) U.S. Cl.
CPC ......... *H04W 52/146* (2013.01); *H04L 1/0003* (2013.01); *H04W 16/28* (2013.01);
(Continued)

(58) Field of Classification Search
CPC . H04W 52/146; H04W 52/08; H04W 52/242; H04W 52/10; H04W 52/38;
(Continued)

(56) References Cited

U.S. PATENT DOCUMENTS 10,736,044 B2\* 8/2020 Ryu ................ H04W 16/28
2015/0018030 A1\* 1/2015 Park ................ H04W 52/04
455/522

(Continued)

OTHER PUBLICATIONS

International Search Report and Written Opinion—PCT/US2019/065591—ISA/EPO—dated Mar. 24, 2020.
(Continued)

*Primary Examiner* — Tu X Nguyen
(74) *Attorney, Agent, or Firm* — Danai Nelisile Mhembere; Patterson & Sheridan, LLP

(57) ABSTRACT

Certain aspects of the present disclosure provide techniques for interference control for uplink transmission, for example, using multiple transmission configurations (e.g., antennas, beams, and/or antenna panels). A method that may be performed by a user equipment (UE) includes determining a transmit power for one or more uplink transmissions to a base station (BS) using one or more transmit power parameters. The one or more transmit power parameters are based, at least in part, on a transmission configuration of the one or more uplink transmissions. The method generally includes transmitting the one or more uplink transmissions to the BS using the determined transmit power.

24 Claims, 11 Drawing Sheets

(51) Int. Cl.
*H04W 52/24* (2009.01)
*H04W 24/10* (2009.01)
*H04W 16/28* (2009.01)
*H04L 1/00* (2006.01)

(52) U.S. Cl.
CPC ........... *H04W 24/10* (2013.01); *H04W 52/08* (2013.01); *H04W 52/242* (2013.01); *H04W 52/243* (2013.01)

(58) Field of Classification Search
CPC ... H04W 16/28; H04W 52/221; H04W 52/36; H04W 72/046; H04W 52/362; H04W 52/58; H04W 52/04; H04W 52/143; H04W 52/228; H04W 40/08; H04W 40/10; H04W 52/18; H04W 52/226; H04W 52/06; H04W 52/12; H04W 52/32; H04W 52/545; H04B 7/0695; H04B 7/0617; H04B 7/0413
See application file for complete search history.

(56) References Cited

U.S. PATENT DOCUMENTS

2016/0183198 A1* 6/2016 Xu ...................... H04W 52/241
455/522
2018/0332541 A1 11/2018 Liu et al.
2019/0190747 A1* 6/2019 Park ...................... H04B 7/0486

OTHER PUBLICATIONS

Nokia et al., "Discussion on NR power control framework", 3GPP Draft; R1-1716127, 3rd Generation Partnership Project (3GPP), Mobile Competence Centre ; 650, Route Des Lucioles; F-06921 Sophia-Antipolis Cedex; France, vol. RAN WG1, No. Nagoya, Japan; Sep. 18, 2017-Sep. 21, 2017 Sep. 17, 2017 (Sep. 17, 2017), XP051339585, 5 Pages, Retrieved from the Internet: URL:http://www.3gpp.org/ftp/Meetings_3GPP_SYNC/RAN1/Docs/.

ZTE: "Discussion on UL power control for multi-panel operation", 3GPP Draft; R1-1812262 Discussion on UL Power Control for Multi-Panel Operation, 3rd Generation Partnership Project (3GPP), Mobile Competence Centre ; 650, Route Des Lucioles ; F-06921 Sophia-Antipoli, vol. RAN WG 1, No. Spokane, USA; Nov. 12, 2018-Nov. 16, 2018 Nov. 11, 2018 (Nov. 11, 2018), XP051554145, 4 Pages, Retrieved from the Internet: URL:http://www.3gpp.org/ftp/Meetings%5F3GPP%5FSYNC/RAN1/Docs/R1%2D1812262%2Ezip.

3GPP TS 38.213 "3rd Generation Partnership Project; Technical Specification Group Radio Access Network; NR Physical Layer Procedures for Control (Release 15)", 3GPP TS 38.213, V15.4.0, Dec. 2018, pp. 1-104, section 7.1.1.

* cited by examiner

INTERFERENCE CONTROL FOR UPLINK TRANSMISSION

CROSS-REFERENCE TO RELATED APPLICATION(S)

This application claims the benefit of and priority to U.S. Provisional Application No. 62/780,825, filed Dec. 17, 2018, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for uplink transmission.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes determining a transmit power for one or more uplink transmissions to a base station (BS) using one or more transmit power parameters. The one or more transmit power parameters are based, at least in part, on a transmission configuration of the one or more uplink transmissions. The method generally includes transmitting the one or more uplink transmissions to the BS using the determined transmit power.

Certain aspects provide a method for wireless communication by a BS. The method generally includes transmitting an indication of one or more uplink transmit power parameters to a UE in a message. The one or more uplink transmit power parameters are based, at least in part, on a transmission configuration of one or more uplink transmissions. The method generally includes receiving the one or more uplink transmissions from the UE. The one or more uplink transmissions are transmitted from the UE based on the one or more uplink transmit power parameters.

Certain aspects provide an apparatus for wireless communication. The apparatus generally includes means for determining a transmit power for one or more uplink transmissions to a BS using one or more transmit power parameters. The one or more transmit power parameters are based, at least in part, on a transmission configuration of the one or more uplink transmissions. The apparatus generally includes means for transmitting the one or more uplink transmissions to the BS using the determined transmit power.

Certain aspects provide an apparatus for wireless communication. The apparatus generally includes means for transmitting an indication of one or more uplink transmit power parameters to a user equipment (UE) in a message. The one or more uplink transmit power parameters are based, at least in part, on a transmission configuration of one or more uplink transmissions. The apparatus generally includes means for receiving the one or more uplink transmissions from the UE. The one or more uplink transmissions are transmitted from the UE based on the one or more uplink transmit power parameters.

Certain aspects provide an apparatus for wireless communication. The apparatus generally includes a memory and at least one processor coupled with the memory. The processor and memory are configured to determine a transmit power for one or more uplink transmissions to a BS using one or more transmit power parameters. The one or more transmit power parameters are based, at least in part, on a transmission configuration of the one or more uplink transmissions; and to transmit the one or more uplink transmissions to the BS using the determined transmit power.

Certain aspects provide an apparatus for wireless communication. The apparatus generally includes a memory and at least one processor coupled with the memory. The processor and memory are configured to transmit an indication of one or more uplink transmit power parameters to a UE in a message. The one or more uplink transmit power parameters are based, at least in part, on a transmission configuration of one or more uplink transmissions. The memory and processor are configured to receive the one or more uplink transmissions from the UE. The one or more uplink transmissions are transmitted from the UE based on the one or more uplink transmit power parameters.

Certain aspects provide a computer readable medium having computer executable code stored thereon for wireless communication. The computer readable medium generally includes code for determining a transmit power for one or more uplink transmissions to a BS using one or more transmit power parameters. The one or more transmit power parameters are based, at least in part, on a transmission configuration of the one or more uplink transmissions. The computer readable medium generally includes code for transmitting the one or more uplink transmissions to the BS using the determined transmit power.

Certain aspects provide a computer readable medium having computer executable code stored thereon for wireless communication. The computer readable medium generally includes code for transmitting an indication of one or more uplink transmit power parameters to a UE in a message. The one or more uplink transmit power parameters are based, at least in part, on a transmission configuration of one or more uplink transmissions. The computer readable medium generally includes code for receiving the one or more uplink transmissions from the UE. The one or more uplink transmissions are transmitted from the UE based on the one or more uplink transmit power parameters.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
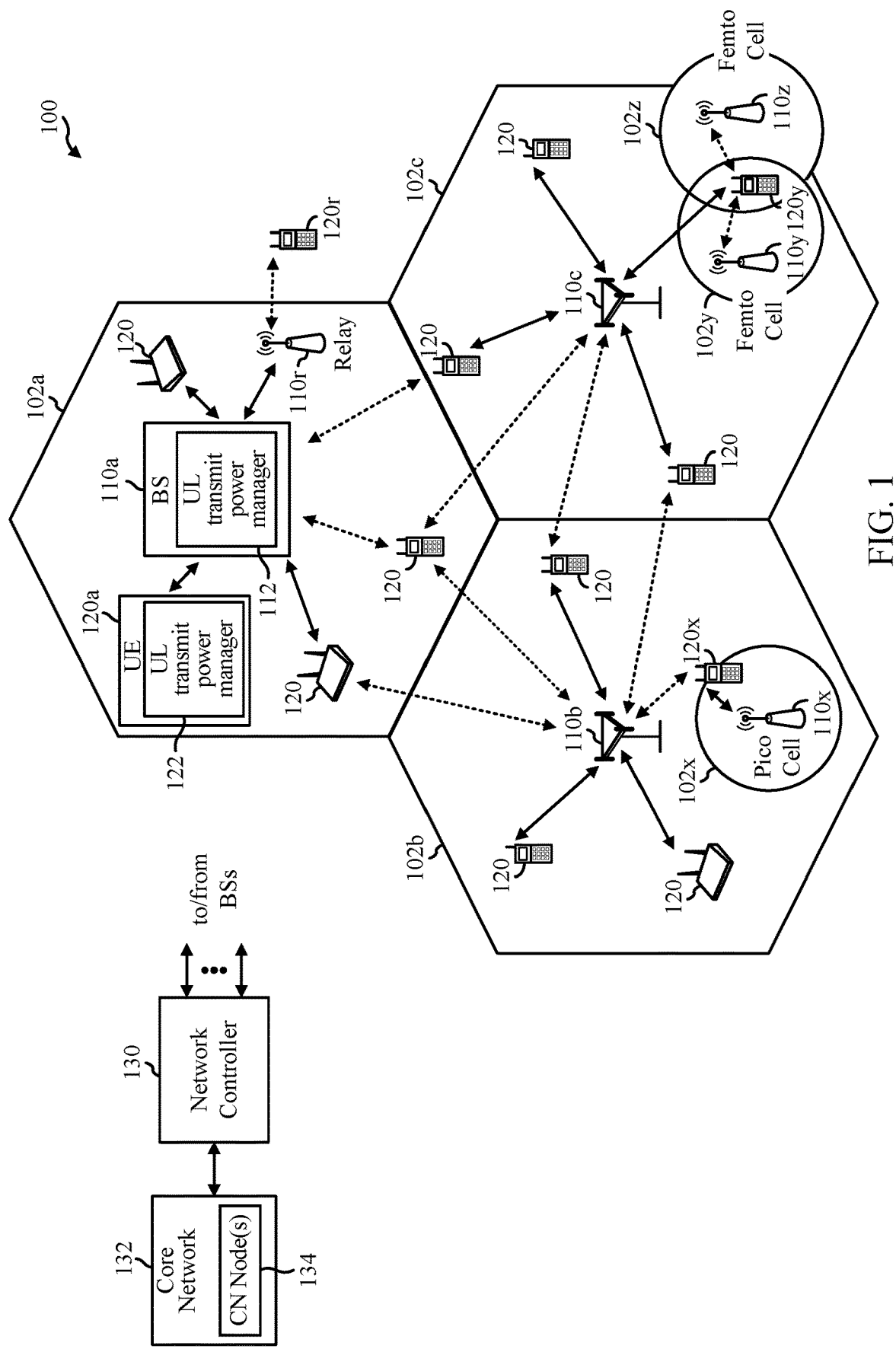
FIG. 1 is a block diagram conceptually illustrating an example telecommunications system, in accordance with certain aspects of the present disclosure.

Aspects of the present disclosure provide apparatus, methods, processing systems, and computer readable mediums for interference control for uplink transmission, for example, using multiple antennas, beams, and/or antenna panels.

In certain systems, a user equipment (UE) may be able to transmit uplink signal(s) using multiple transmission configurations, such as using multiple different antennas, beams, and/or antenna panels (e.g., antenna arrays), to a serving base station (BS) and/or to multiple BSs. In some cases, the UE can transmit simultaneously (e.g., concurrently, near simultaneously, and/or within the same transmission time interval (TTI)) using the different transmission configurations. The multiple transmission configurations may point signals in different directions and, therefore, the signals may follow different signal paths. Thus, the uplink signals may cause different levels of interference to neighboring cells. In certain systems, transmit power control may account for a location of the UE within a cell, but may not account for the transmission configuration of uplink transmissions by the UE. Accordingly, techniques for interference control uplink transmission are desired, that may account for the transmission configuration, for example, when the UE transmits using multiple different antennas, beams, and/or antenna panels.

Aspects of the present disclosure provide for transmit power control for uplink transmissions based on the transmission configuration (e.g., the antennas, beams, and/or antenna panels) of (e.g., used for) the uplink transmissions. In some examples, the UE determines transmit power parameters (e.g., referred to as alpha parameters or alpha adjustment parameters in an uplink transmit power control algorithm) based on the transmission configuration (e.g., an antenna panel index and/or beam index). The alpha parameter is a term in the uplink power control algorithm that, according to aspects of the present disclosure, accounts for transmission configuration. Thus, for uplink transmission, the UE can compute the uplink transmit power to use for each uplink transmission according to an algorithm involving the determined alpha value (which accounts for the transmission configuration of the uplink transmission). Different transmission configurations may be associated with different alpha values based on the level of interference caused by the transmission configuration to neighboring cells. In some examples, the BS can indicate the alpha values to the UE. In some examples, the UE can autonomously determine the alpha values, for example, based on feedback or measurement of signals reference signals (RSs) from the neighboring cells and/or the serving cell. In some examples, the alpha value can be determined using the feedback or measurements based on a mapping (e.g., such one or more look-up tables (LUTs), a formula, etc.). Thus, the interference to neighboring cells caused by the uplink transmissions can be controlled/mitigated taking into account the transmission configurations of the uplink transmissions.

The following description provides examples of interference control for uplink transmission, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or 5G wireless technologies, aspects of the present disclosure can be applied in other generation-based communication systems, including later technologies.

New radio (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR may support beamforming and beam direction may be dynamically configured. NR may support multiple-input multiple-output (MIMO) transmissions with precoding. MIMO configurations in the downlink may support up to 8 transmit antennas with multi-layer downlink transmissions up to 8 streams and up to 2 streams per UE. NR may support multi-layer transmissions with up to 2 streams per UE. NR may aggregation of multiple cells (e.g., up to 8 serving cells).

FIG. 1 illustrates an example wireless communication network 100 in which aspects of the present disclosure may be performed. As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometime referred to as a cell may, which may be stationary or may move according to the location of a mobile BS 110. In some examples, the BSs 110 may be interconnected to one another and/or to one or more other BSs 110 or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs and provide coordination and control for these BSs. The network controller 130 may communicate with the BSs 110 via a backhaul.

The BSs 110 communicate with UEs 120a-y (each also individually referred to herein as UE 120 or collectively as UEs 120). The UEs 120 may be dispersed throughout the wireless communication network 100, and each UE 120 may be stationary or mobile. Wireless communication network 100 may also include relay stations (e.g., relay station 110r), also referred to as relay BSs, relays, and the like, that receive a transmission of data and/or other information from an upstream station (e.g., a BS 110a or a UE 120r) and send a transmission of the data and/or other information to a downstream station (e.g., a UE 120 or a BS 110), or that relay transmissions between UEs 120 to facilitate communication between devices.

According to certain aspects, the UEs 120 may be configured for multi-panel uplink transmission with the BSs 110. For example, the UE 120a may be configured with multiple transmission configurations (e.g., antenna arrays/panels and/or beams) for uplink transmission to the BS 110a. As shown in FIG. 1, the UE 120a has a transmit power manager 122 that may be configured for determining transmit power using one or more transmit power parameters based on a transmission configuration for uplink transmission, according to aspects described herein. The one or more transmit power parameters may be indicated to the UE 120a by the BS 110a or determined autonomously by the UE 120a (e.g., based on feedback or measurements of pilots from one or more neighboring BSs 110b, 110c). As shown in FIG. 1, the BS 110a has a transmit power manager 112 that may be configured for transmitting an indication of the one or more transmit power parameters to the UE 120a, according to aspects described herein. The UE 120a then transmits the uplink transmissions to the BS 110a at the transmit power level based on the one or more transmit power parameters.

Figure 2:
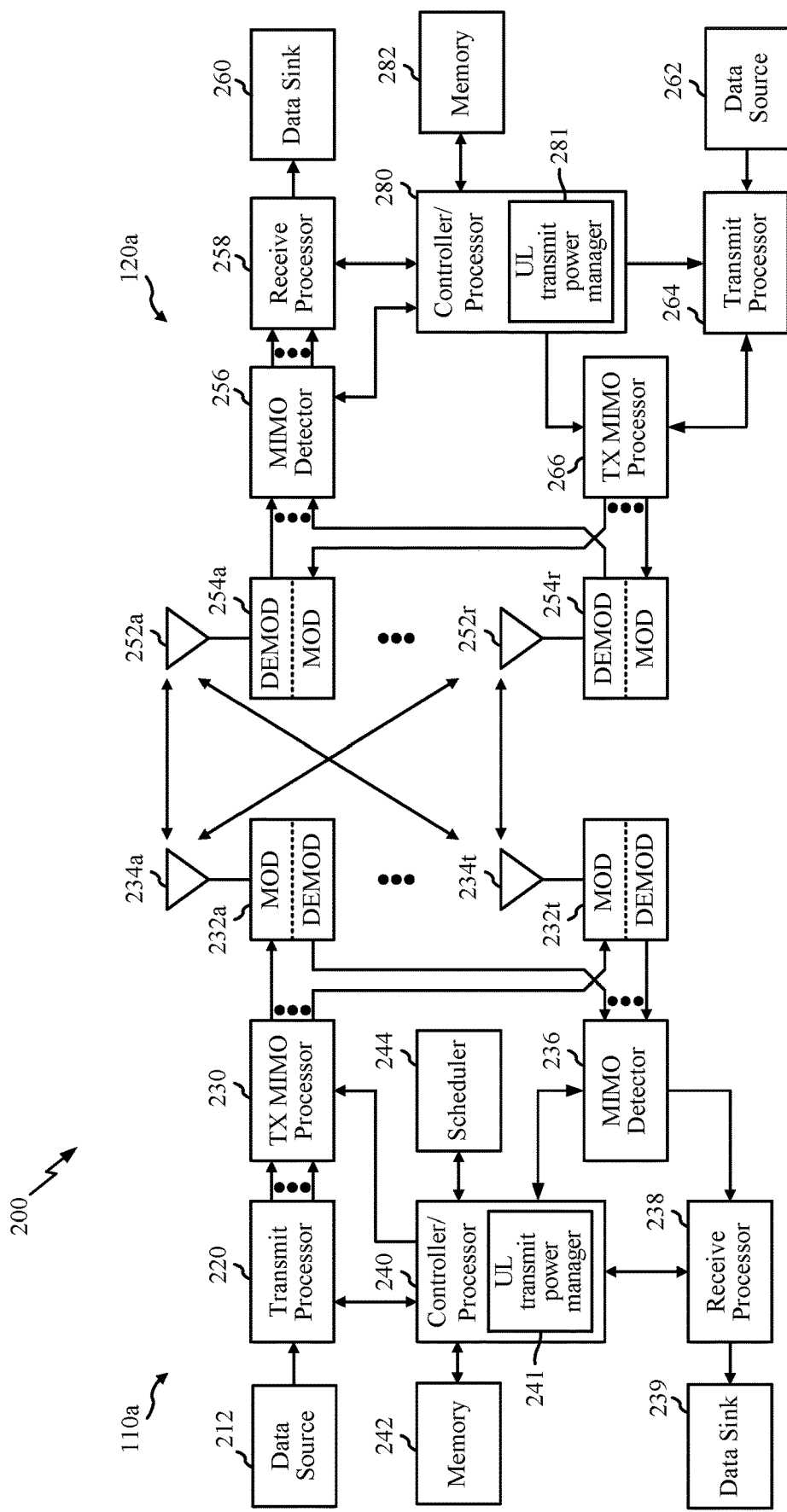
FIG. 2 is a block diagram conceptually illustrating a design of an example base station (BS) and user equipment (UE), in accordance with certain aspects of the present disclosure.

FIG. 2 illustrates example components of the BS 110a and UE 120a (as depicted in FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and channel state information reference signal (CSI-RS). A transmit (TX) MIMO processor 230 may perform spatial processing (e.g., precoding) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At the UE 120*a*, the antennas 252*a* through 252*r* may receive the downlink signals from the BS 110*a* and may provide received signals to the demodulators (DEMODs) in transceivers 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254*a* through 254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a* through 254*r* (e.g., for SC-FDM, etc.), and transmitted to the BS 110*a*. At the BS 110*a*, the uplink signals from the UE 120*a* may be received by the antennas 234, processed by the demodulators 232, detected by a MIMO detector 236, if applicable, and further processed by a receive processor 238 to obtain decoded data and control information sent by the UE 120*a*. The receive processor 238 may provide the decoded data to a data sink 239 and the decoded control information to the controller/processor 240.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. The controllers/processors 240 and 280 may direct the operation at the BS 110*a* and the UE 120*a*, respectively. As shown in FIG. 2, the processor 240 of the BS 110*a* has a transmit power manager 241 that may be configured for transmitting an indication of one or more transmit power parameters to the UE 120*a*, according to aspects described herein. As shown in FIG. 2, the processor 280 of the UE 120*a* has a transmit power manager 281 that may be configured for determining a transmit power using one or more transmit power parameters for one or more uplink transmissions based on a transmission configuration, according to aspects described herein. The memories 242 and 282 may store data and program codes for BS 110*a* and UE 120*a*, respectively. A scheduler 244 may schedule UEs for data transmission on the downlink and/or uplink.

NR may utilize orthogonal frequency division multiplexing (OFDM) with a cyclic prefix (CP) on the downlink and/or uplink and single-carrier frequency division multiplexing (SC-FDM) on the uplink. NR may support half-duplex operations using time division duplexing (TDD). OFDM and SC-FDM partition the system bandwidth into multiple orthogonal subcarriers, also referred to as tones, bins, etc. Each subcarrier may be modulated with data. Modulation symbols are sent in the frequency domain with OFDM and in the time domain with SC-FDM. The spacing between adjacent subcarriers may be fixed, and the total number of subcarriers may be dependent on the system bandwidth. For example, the spacing of the minimum resource allocation (e.g., a resource block (RB)) may be 12 consecutive subcarriers. The system bandwidth may also be partitioned into subbands. A subband may cover multiple RBs (e.g., 6 RBs). NR may support a base subcarrier spacing (SCS) of 15 KHz and other SCS may be defined with respect to the base SCS (e.g., 30 kHz, 60 kHz, 120 kHz, 240 kHz, etc.).

Figure 3:
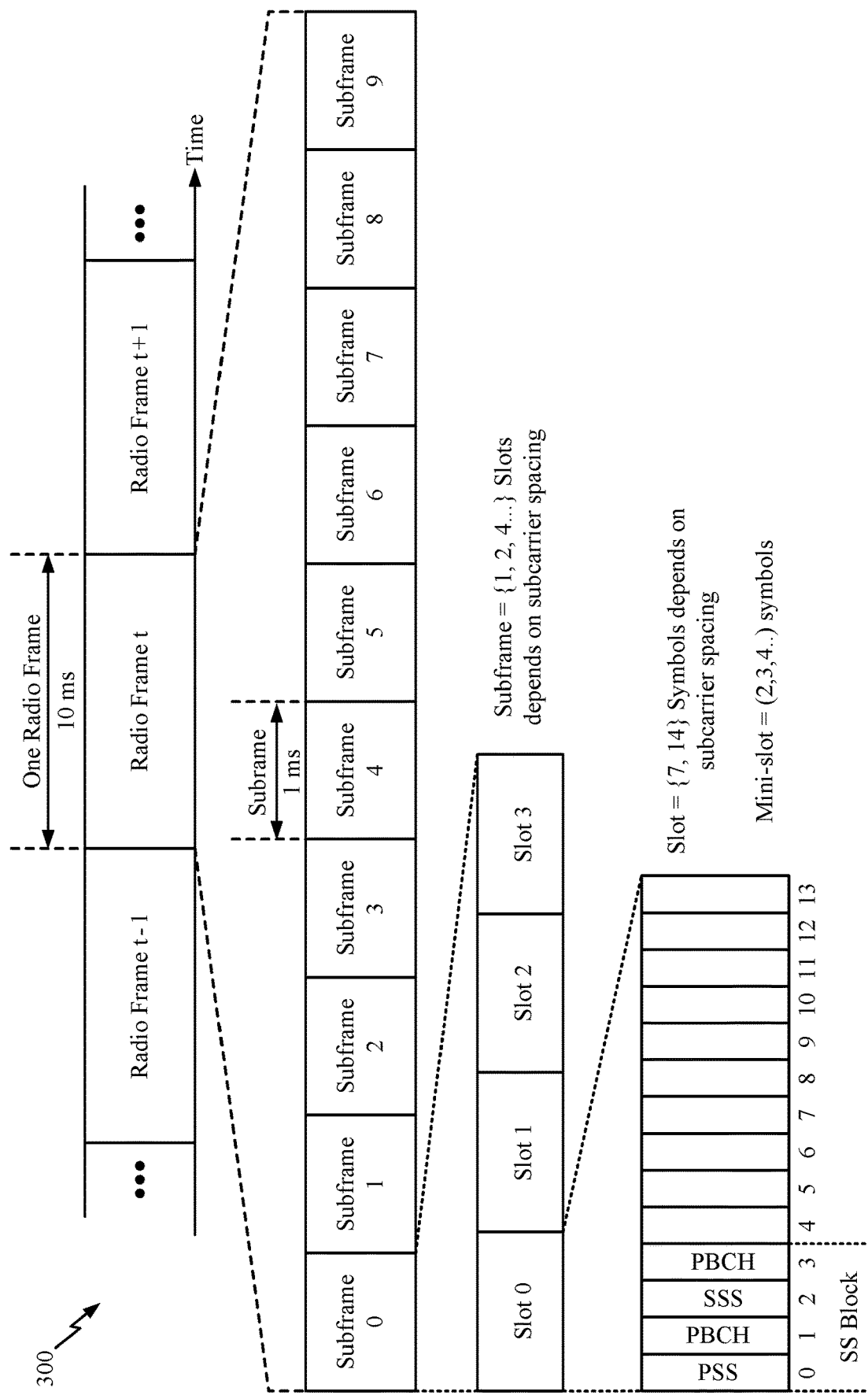
FIG. 3 illustrates an example of a frame format for a new radio (NR) system, in accordance with certain aspects of the present disclosure.

In NR, a subframe is 1 ms, but the basic TTI is referred to as a slot. FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

As mentioned above, in certain systems (e.g., 5G NR), a UE (e.g., such as the UE 120*a*) can transmit uplink signals with different transmission configurations. The uplink transmissions with different transmission configurations may be simultaneous (e.g., concurrent, near simultaneous, and/or within a TTI) and may use the same frequency band. The uplink transmissions may be to the serving BS (e.g., such as the BS 110*a*). As used herein, a transmission configuration may be associated with, but not limited to, a transmission reception point (TRP), antenna, antenna array, panel, beam, channel, link, and/or quasi co-location (QCL) group.

In some cases, the UE can transmit simultaneous uplink transmissions using different transmission configurations for millimeter wave (mmW) communications with beamforming to direct the signal. In some examples, a UE may have up to sixteen antennas in one array/panel, and the UE may have multiple arrays/panels which may be located at various locations of the UE. In some examples, different arrays may use different beams to form multiple links. Simultaneous uplink transmissions with different transmission configurations may allow increased throughput (e.g., by simultaneously transmitting data to the BS using the multiple antennas, beams, and/or antenna panels) and/or increased reliability (e.g., by sending the same information from the multiple antennas, beams, and/or panels).

In certain systems, uplink transmission with different transmission configuration may be configured for PUSCH and/or SRS transmissions by the UE. In some examples, the UE is configured with one or more SRS resource sets configuring SRS resources for SRS transmission. Each SRS resource set may be associated with a UE antenna panel for both codebook-based (e.g., beamformed) and non-codebook based (e.g., non-beamformed) PUSCH transmission. In some examples, the SRS resource indicator (SRI) field in downlink control information (DCI) may be used to indicate (by the BS) and select (by the UE) multiple SRS resources from the configured SRS resource sets, each set associated with a UE antenna panel. For example, the BS and UE may be configured with a table or mapping of the SRI field to which SRS resource, and from which SRS resource set, is to be used for a multi-panel uplink transmission. In some examples, the SRI in the DCI may indicate multiple SRS resources from one SRS resource set. In some examples, of the multiple SRS resources indicated by the BS, the UE may select one to use for uplink transmission.

The different transmission configuration may cover different spatial directions. However, because the multiple UE antenna panels and/or beams for the transmission may point in different directions, the transmissions follow different signal paths and therefore, may cause different levels of interference to neighboring cells.

Figure 4:
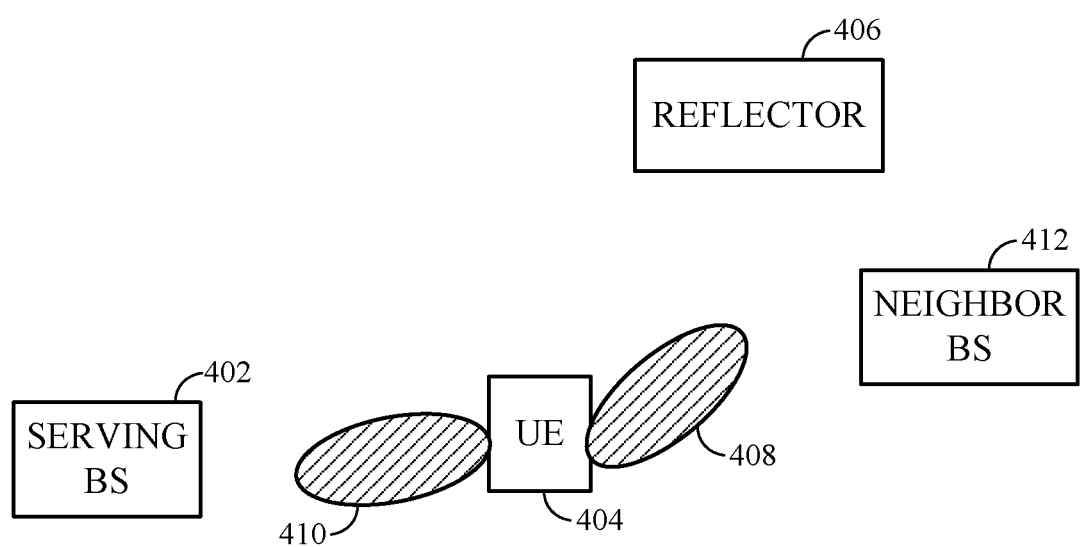
FIG. 4 illustrates an uplink transmission scenario using different antenna panels, in accordance with certain aspects of the present disclosure.

FIG. 4 illustrates an example multi-panel uplink transmission scenario leading to different signals path which may cause different amounts of interference by different uplink signals transmitted from the UE via different transmission configurations, in accordance with certain aspects of the present disclosure. As shown in FIG. 4, the UE 404 can send a first uplink transmission 410 to the BS 402 via with a first transmission configuration (e.g., a first antenna, beam, and/or antenna panel). As shown in FIG. 4, the first uplink transmission with the first transmission configuration may be oriented generally towards the serving BS 402. The UE can send a second uplink transmission 408 using a second uplink transmission 408 configuration (e.g., a second antenna, beam, and/or antenna panel). In some examples, the first uplink transmission 410 and the second uplink transmission 408 may be transmitted simultaneously or concurrently. As shown in FIG. 4, the second uplink transmission 408 may be oriented generally in a different direction than the first uplink transmission 410, which may be toward a reflector 406 and/or a neighboring BS 412. Thus, in the example shown in FIG. 4, the uplink signal using the first transmission configuration may cause relatively little or no interference to the neighbor BS 412, while an uplink signal using the second transmission configuration may cause relatively higher interference to the neighbor BS 412.

Figure 5:
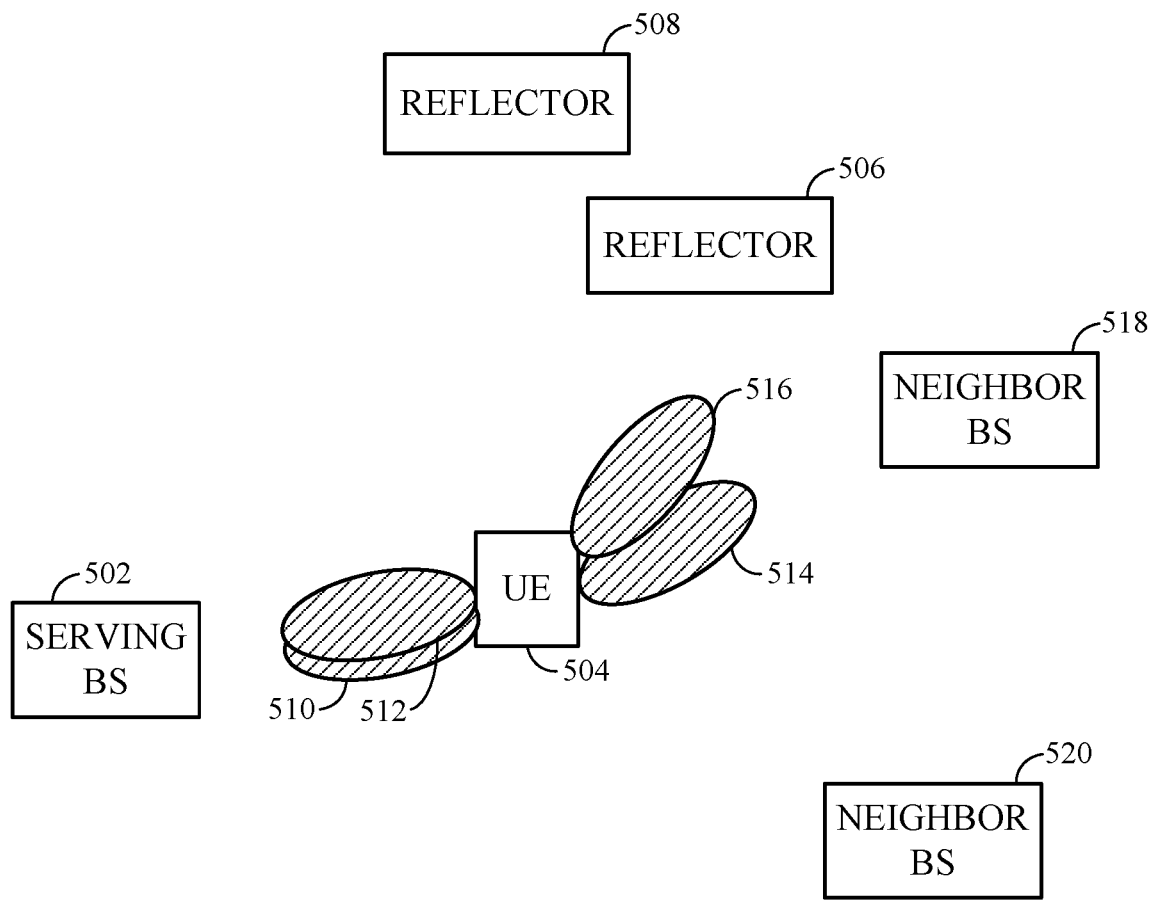
FIG. 5 illustrates another uplink transmission scenario, in accordance with certain aspects of the present disclosure.

The uplink transmission scenario illustrated in FIG. 4 is merely illustrative. It should be appreciated that many different scenarios are possible, and may lead to different signals paths and different amounts of interference by different uplink signals transmitted from the UE via different transmission configurations. For example, as shown in FIG. 5, the UE 504 can transmit multiple uplink transmissions 510, 512, 514, 516 using different transmission configurations for each of the uplink transmissions. For example, the different transmission configurations may use different antenna panels, different beams in beamformed directions from one antenna panel, or both different antenna panels and different beamformed directions. As shown in FIG. 5, uplink transmissions 510, 512 may be oriented generally towards the serving BS 502, while uplink transmissions 514, 516 may be oriented generally towards a neighboring BS 518. The uplink transmissions can use only a single panel/array and/or beam at a time, or the UE can transmit simultaneous uplink transmissions using multiple different antenna panels/arrays and/or beams. The serving BS 502, UE 504, and neighbor BSs 518, 520 may include any number of arrays and arrays including any number of antennas. The antennas and/or antenna panels/arrays may be at any location on the front, sides, or back of the UE, and there may be any number of uplink transmissions transmitted via the multiple antennas and/or antenna panels. There may be various numbers of neighboring BSs and/or other UEs interfered by uplink transmissions from the UE 504. Further, there could be various numbers of signal reflectors, at multiple different possible locations in the system, that reflect signals in any of various directions, and any one signal could be reflected via multiple signal reflectors, which can result in various levels of interference and/or potential interference caused by uplink transmissions via the different antenna panels/arrays and/or beams to one or more neighboring BSs.

In certain systems, uplink transmit power may be based (in part) on the location of the UE. For example, UEs near the cell edge may reduce uplink transmit power to reduce interference to neighboring cells and UEs close to the serving BS transmit at higher uplink transmit power because they may cause less interference to neighboring cells. In some examples (e.g., the PUSCH power control loop in 3GPP TR 38.213), the uplink transmit power is computed as:

$$P_{PUSCH,b,f,c}(i, j, q_d, l) = \\ \min \begin{cases} P_{CMAX,f,c}(i), \\ P_{O\_PUSCH,b,f,c}(j) + 10\log_{10}(2^\mu \cdot M_{RB,b,d,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{cases}$$

where $P_{CMAX,f,c}(i)$ is the maximum UE PUSCH transmit power capability, $P_{O\_PUSCH,b,f,c}(j)$ is the uplink transmit power desired by the BS (e.g., a target uplink transmit power), $10 \log_{10} (2^\mu \cdot M_{R,B,b,d,c}^{PUSCH}(i))$ is a bandwidth parameter (e.g., more transmit power for larger bandwidth), $\alpha_{b,f,c}(j)$ is an interference controlling parameter which may be between 0 and 1 for reducing interference for cell edge UEs, $PL_{b,f,c}(q_d)$ is a pathloss parameter (e.g., estimated from reference signals), $\Delta_{TF,b,f,c}(i)$ is a modulation coding scheme (MCS) adjustment parameter (e.g., more power for higher order modulation), and $f_{b,f,c}(i, l)$ is a transmit power command (TPC) adjustment parameter (e.g., received from the serving BS). Thus, in the formula, the uplink transmit power does not account for the transmission configuration (e.g., UE antenna panel/array or beam) and, therefore, may not fully account for the different levels of interference or potential interference that the uplink transmissions from with different transmission configurations may cause to neighbor cells.

However, as discussed above, an uplink transmission oriented towards a neighboring cell may cause interference to the neighboring cell even if the UE is not near the cell edge. Therefore, techniques for interference control for uplink transmission are desired.

Example Interference Control For Uplink Transmission

Aspects of the present disclosure provide for transmit power control for uplink transmissions based on (e.g., taking into account) the transmission configuration (e.g., antenna, beam, and/or antenna panel) of (e.g., used for) the uplink transmissions. Thus, the interference to neighboring cells can be controlled/mitigated and, thereby, reception at the neighboring cells can be improved. In some examples, a user equipment (UE) can determine one or more transmit power parameters for uplink transmission. The transmit power parameters are based on the transmission configuration of the uplink transmission. For example, an uplink transmit power control algorithm may involve an alpha parameter (e.g., interference controlling parameter) that is adjusted based on which transmission configuration is used for the uplink transmission. In some examples, the UE receives an indication of the transmit power parameters from its serving base station (BS). In some examples, the UE can determine the one or more transmit power parameters autonomously, for example, using feedback or measurements of pilots from the neighbor cells.

According to certain aspects, the geometry of the system may change over time. For example, the UE may be in motion and/or various signal reflectors or BSs may be in motion. Thus, the corresponding signal paths associated with the transmission configurations can also change over time. The transmit power parameters of the uplink transmissions may be updated (e.g., re-determined) over time, for example, to account for the changed signal paths.

Figure 6:
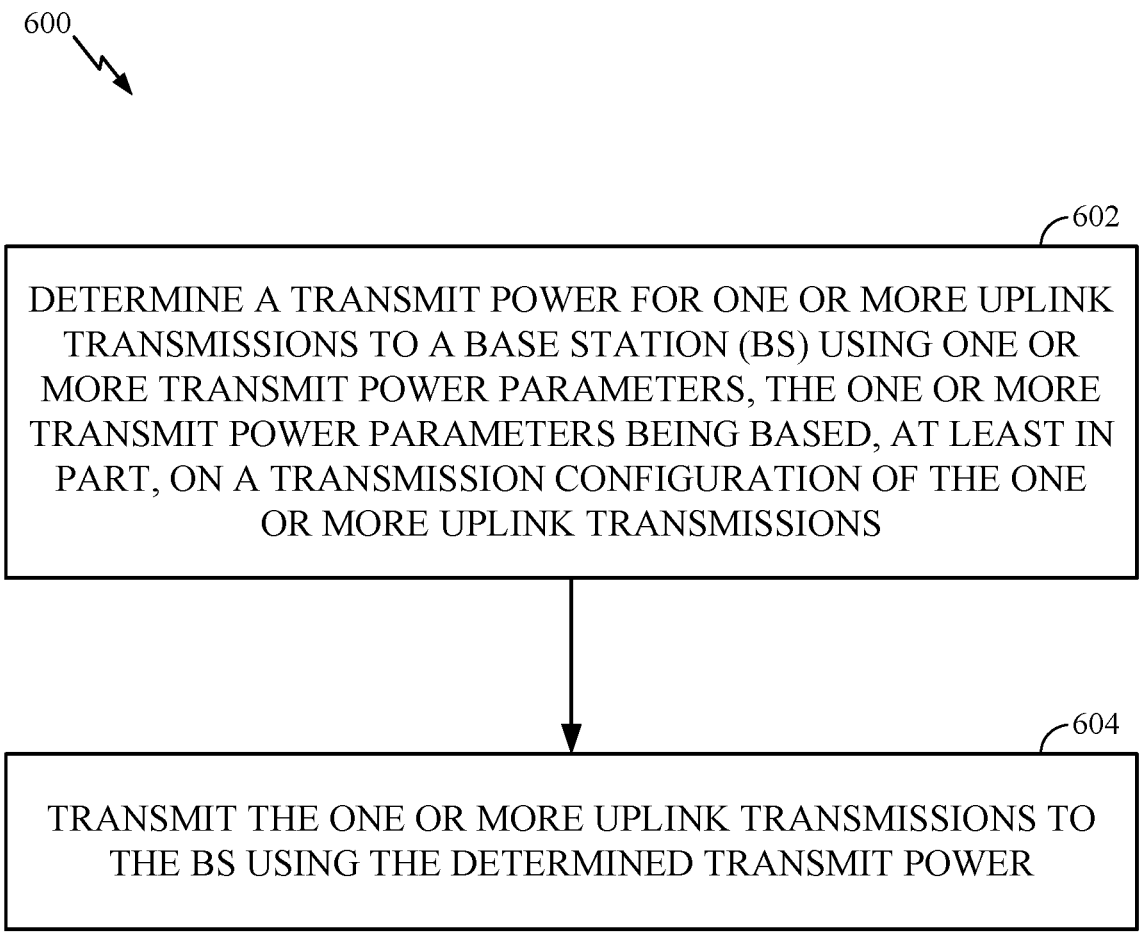
FIG. 6 is a flow diagram illustrating example operations by a UE for wireless communication, in accordance with certain aspects of the present disclosure.

FIG. 6 is a flow diagram illustrating example operations 600 for wireless communication, in accordance with certain aspects of the present disclosure. The operations 600 may be performed, for example, by a UE (e.g., such as the UE 120a in the wireless communication network 100). Operations 600 may be implemented as software components that are executed and run on one or more processors (e.g., processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., processor 280) obtaining and/or outputting signals.

The operations 600 may begin, at 605, by determining a transmit power for one or more uplink transmissions to a BS using one or more transmit power parameters. The one or more transmit power parameters are based, at least in part, on a transmission configuration of the one or more uplink transmissions.

According to certain aspects, the UE may use a PUSCH power control loop (e.g., a closed loop) with an alpha parameter that accounts for the transmission configuration. In some examples, the alpha parameter may be based on the beam index and panel index, $\alpha_{b,f,c}$(j, beam index, panel index), for example, in addition to a location of the UE in the cell, such as whether the UE is near the cell edge or near the serving BS (j). In some examples, the PUSCH power control loop to compute the uplink transmit power may be:

$$P_{PUSCH,b,f,c}(i, j, q_d, l) = \min \begin{cases} P_{CMAX,f,c}(i), \\ P_{O\_PUSCH,b,f,c}(j) + 10\log_{10}(2^\mu \cdot M_{RB,b,d,c}^{PUSCH}(i)) + \\ \alpha_{b,f,c}(j, \text{beam index, panel index}) \cdot \\ PL_{b,f,c}(q_d) + \Delta_{TF,b,f,c}(i) + f_{b,f,c}(i, l) \end{cases}$$

According to certain aspects, based on the transmission configuration of the uplink transmission, the UE applies the appropriate alpha parameter and computes the uplink transmit power. In some examples, the UE selects the transmission configuration to use for an uplink transmission. In some examples, the UE receives an indication from the BS of the transmission configuration to use. For example, the UE may receive signaling from the BS scheduling the one or more uplink transmissions and the signaling may also indicate the transmission configuration to use for the scheduled one or more uplink transmissions.

According to certain aspects, the UE may receive and/or determine the one or more transmit power parameters and use the one or more transmit power parameters to determine the transmit power at 605. In some examples, the UE receives the one or more transmit parameters (e.g., the alpha parameter) from the BS.

In some examples, the UE may determine the one or more transmit power parameters based on a mapping, which may include one or more lookup tables (LUTs). The mapping may map the transmission configuration (e.g., map beam and/or panel indices) to the alpha parameter and/or to an alpha parameter adjustment value.

In some examples, the UE receives feedback from the serving BS and/or one or more neighbor BSs. Based on the feedback, the UE may determine a level of interference or potential interference caused by uplink transmission using the different transmission configurations. For example, the UE may measure pilots (e.g., reference signals) received from the neighbor BSs. Based on a channel reciprocity assumption, the UE may assume the uplink channel and, thus, the level of interference caused by uplink transmission. Based on the level of interference (e.g., based on the pilot measurements), the UE can determine the alpha parameter, for example, based on a mapping or a formula (e.g., a ratio of the signal from the serving BS and strength of the signal measured from a neighboring BS, which can be applied to an alpha value received from the serving BS).

At 610, the UE transmits the one or more uplink transmissions to the BS using the determined transmit power. According to certain aspects, the UE may use a higher transmit power for transmission configurations that cause less interference to one or more neighbor BSs and a lower transmit for transmission configurations that cause higher interference to one or more neighbor BSs. For example, the UE may use a higher transmit power (e.g., a higher alpha parameter) for an uplink transmission oriented generally toward the serving BS and a lower transmit power (e.g., a lower alpha parameter) for an uplink transmission oriented generally toward a neighbor BS. In some examples, the UE may use both (or multiple) transmission configurations for simultaneous (e.g., concurrent, near simultaneous, and/or within a transmission time interval (TTI)) uplink transmission. In this case, the UE may use a higher transmit power for uplink transmission(s) oriented generally toward the serving BS than the transmit power for simultaneous uplink transmission(s) oriented generally toward the neighbor BS.

Figure 7A:
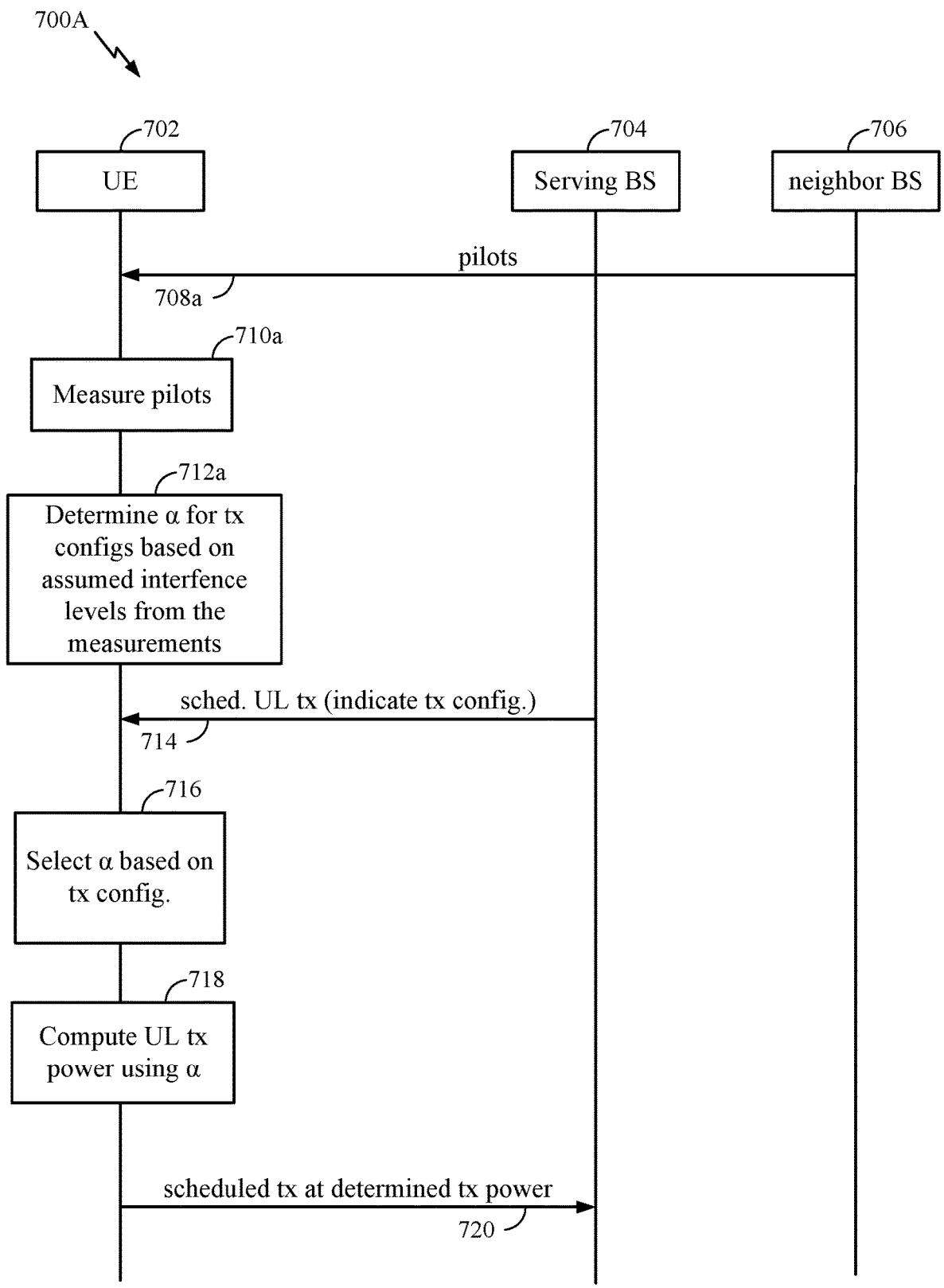
FIG. 7A is an example call for interference control for uplink transmission, in accordance with certain aspects of the present disclosure.

FIG. 7A is diagram illustrating a call flow 700A for example signaling and operations for interference control for uplink transmission, in accordance with certain aspects of the present disclosure. In the example in FIG. 7A, the UE may determine the transmit power parameters associated with different transmission configurations. As shown in FIG. 7A, at 708a, the UE 702 may receive pilots (e.g., RSs) from one or more neighboring BSs 706 using multiple different transmission configurations. Based on measurement of the pilots at 710a, the UE 702 can determine, at 712a, the alpha parameters associated with the different transmission configurations, for example based on an assumed interference or potential interference level (e.g., via a channel reciprocity assumption). At 714, the UE 702 receives signaling from the serving BS 704 scheduling the UE 714 for one or more uplink transmissions. In some examples, the signaling from the BS 704, at 714, may also include an indication of the transmission configuration (e.g., the panel and/or beam index) for the UE 702 to use for the scheduled uplink transmission(s). In some examples, the UE can select (not shown) the transmission configuration to use for the scheduled uplink transmission(s). Then, at 716, the UE 702 selects the alpha parameter associated (e.g., the association determined at 712a) with the indicated or selected transmission configuration for the uplink transmission(s) and, at 718, the UE 702 computes the uplink transmit power using the alpha parameter selected at 716. At 720, the UE 702 sends the scheduled uplink transmission(s) to the serving BS 704 at the uplink transmit power computed at 718.

Figure 7B:
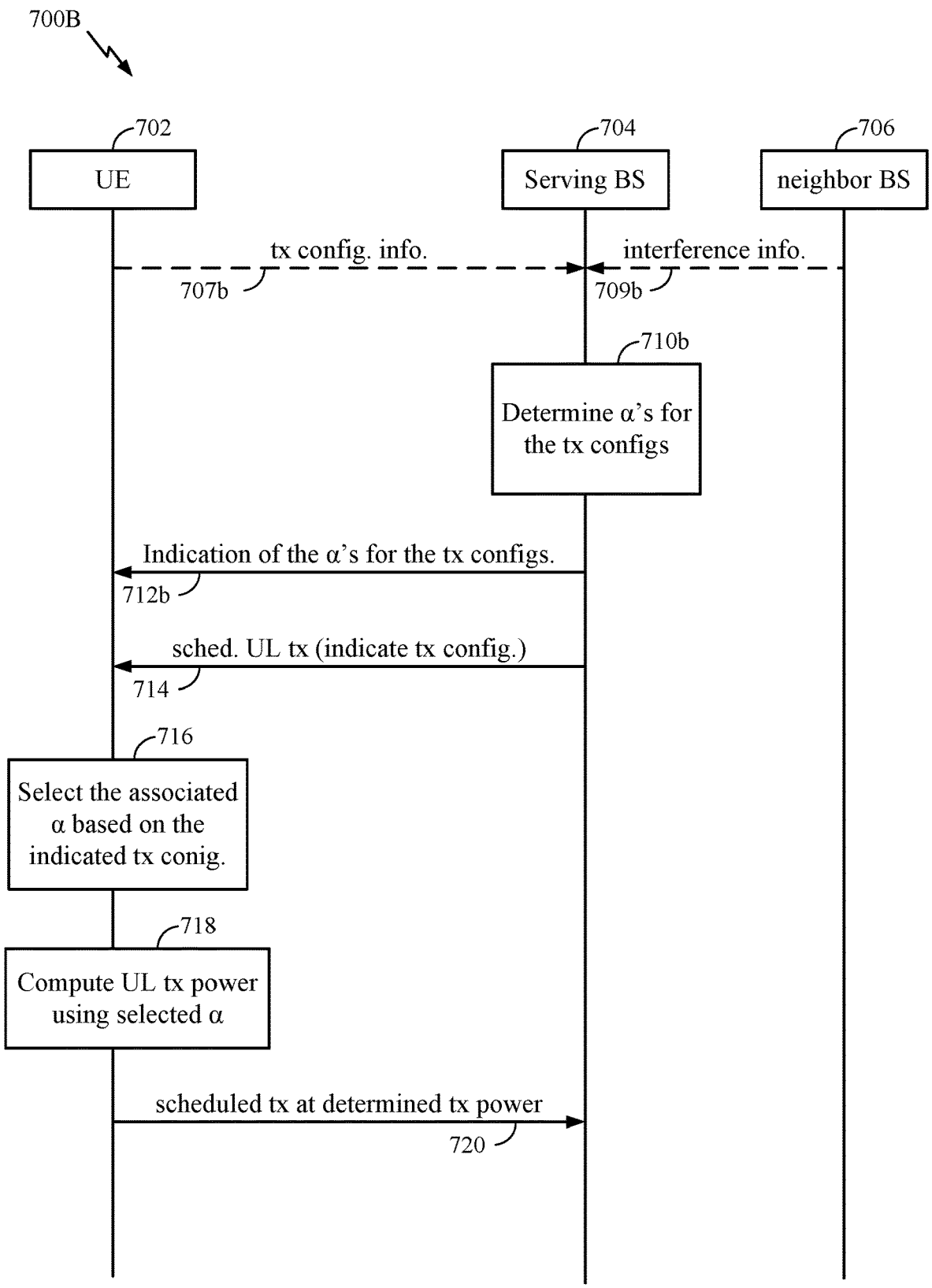
FIG. 7B is another example call for interference control for uplink transmission, in accordance with certain aspects of the present disclosure.

In some examples, rather than the UE 702 determining the alpha parameters for different transmission configurations as shown in FIG. 7A, the serving BS 704 can determine the alpha parameters for different transmission configurations and transmit an indication of the alpha parameters to the UE 702, as shown in FIG. 7B. In some examples, the serving BS 704 determine the alpha parameter based on information from the UE 702 and/or from the one or more neighbor BSs 706. For example, the serving BS 704 may receive transmission configuration information from the UE 702 at 707b. In some examples, the transmission configuration information may indicate the UE antenna panels and/or beams at the UE 702, the orientation and/or location of the panels and/or beams, and/or a location of the UE 702. In some examples, the serving BS 704 may receive interference information from the one or more neighbor BSs 706 at 709b. The interference information may include information regarding a level of interference being experienced by the neighbor BS 706 and/or information regarding the location of the neighbor BS 706. Based on the information received from the UE 702 and/or the one or more neighbor BSs 706, the serving BS 704 may determine a level of interference or potential interference caused by uplink transmissions using the different transmission configurations. At 710b, the serving BS 704 may determine the alpha parameters for the different transmission configurations based on the determined interference levels, and the serving BS 604 indicates the alpha parameters to the UE 702 at 712b.

Figure 8:
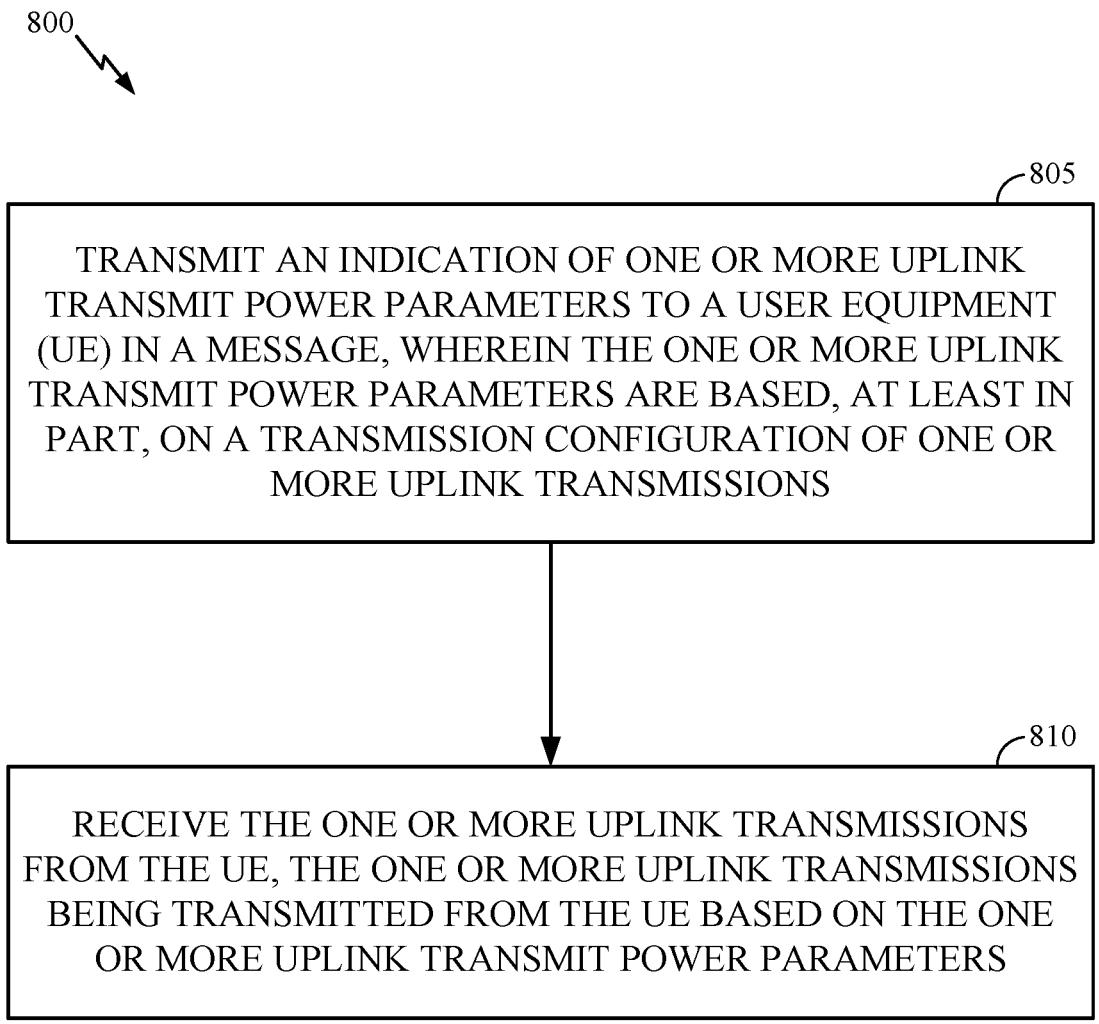
FIG. 8 is a flow diagram illustrating example operations by a BS for wireless communication, in accordance with certain aspects of the present disclosure.

FIG. 8 is a flow diagram illustrating example operations 800 for wireless communication, in accordance with certain aspects of the present disclosure. The operations 800 may be performed, for example, by a BS (e.g., such as the BS 110a in the wireless communication network 100). The operations 800 may be complimentary operations by the BS to the operations 600 performed by the UE. Operations 800 may be implemented as software components that are executed and run on one or more processors (e.g., processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., processor 240) obtaining and/or outputting signals.

The operations 800 may begin, at 805, by transmitting an indication of one or more uplink transmit power parameters to a UE in a message. The one or more uplink transmit power parameters are based, at least in part, on a transmission configuration of one or more uplink transmissions. In some examples, the BS may communicate (e.g., via a backhaul) with one or more neighbors BSs to determine the one or more uplink transmit power parameters. For the example, the BS may communicate with the neighbors BSs to determine a level of interference or potential level interference to one or more neighbor BSs caused by transmission from the UE using the transmission configuration, and determine the one or more uplink transmit power parameters based on the determined level of interference or potential interference.

In some examples, the BS may determine different uplink transmit power parameters for different transmission configurations. The BS may determine a higher transmit power parameter for transmission configurations causing less interference or potential interference to neighboring BSs and a lower transmit power parameter for transmission configurations causing more interference to neighboring BSs.

At 810, the BS receives the one or more uplink transmissions from the UE. The one or more uplink transmissions are transmitted from the UE based on the one or more uplink transmit power parameters.

According to certain aspects, the BS signals the UE to schedule the one or more uplink transmissions. The signaling may indicate the transmission configuration(s) to use for the scheduled one or more uplink transmissions. The BS may receive the scheduled uplink transmissions from the UE at a power level based on the indicated transmit power parameters associated with the transmission configuration(s).

Figure 9:
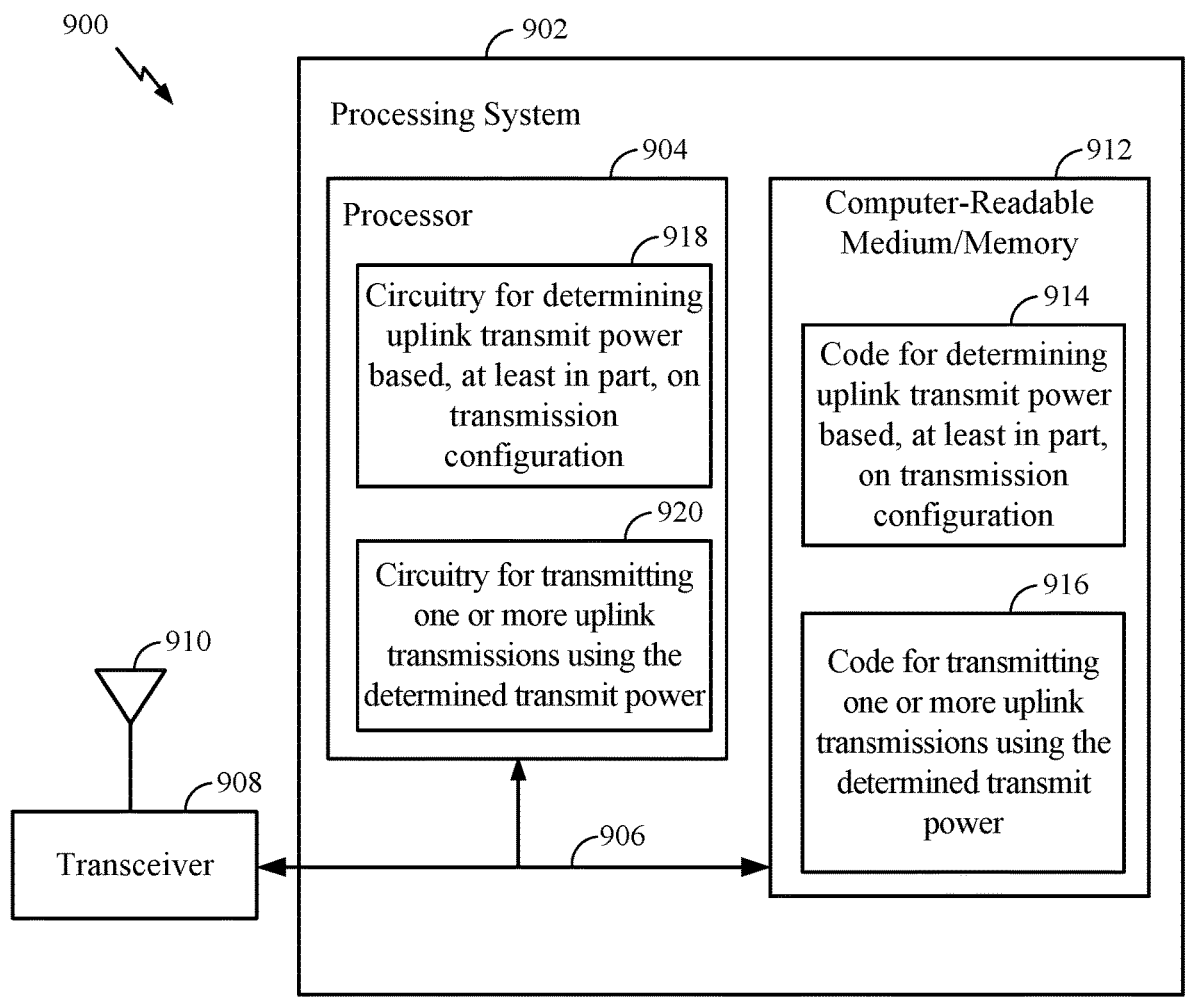
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 6. The communications device 900 includes a processing system 902 coupled to a transceiver 908. The transceiver 908 is configured to transmit and receive signals for the communications device 900 via an antenna 910, such as the various signals as described herein, for example, for transmitting uplink transmissions with different transmission configuration. The processing system 902 may be configured to perform processing functions for the communications device 900, including processing signals received and/or to be transmitted by the communications device 900, such as determining one or more transmit power parameters for a multi-panel uplink transmission.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 6, or other operations for performing the various techniques discussed herein for interference control for uplink transmission. In certain aspects, computer-readable medium/memory 912 stores code 914 for determining uplink transmit power for one or more uplink transmissions using one or more transmit power parameters based, at least in part, on a transmission configuration of the uplink transmissions; and code 916 for transmitting the one or more uplink transmissions based on the determined transmit power, in accordance with aspects of the present disclosure. In certain aspects, the processor 904 has circuitry configured to implement the code stored in the computer-readable medium/memory 912. The processor 904 includes circuitry 918 for determining transmit power for one or more uplink transmissions using one or more transmit power parameters based on a transmission configuration of the one or more uplink transmissions; and circuitry 920 for transmitting the one or more uplink transmissions based on the determined transmit power.

Figure 10:
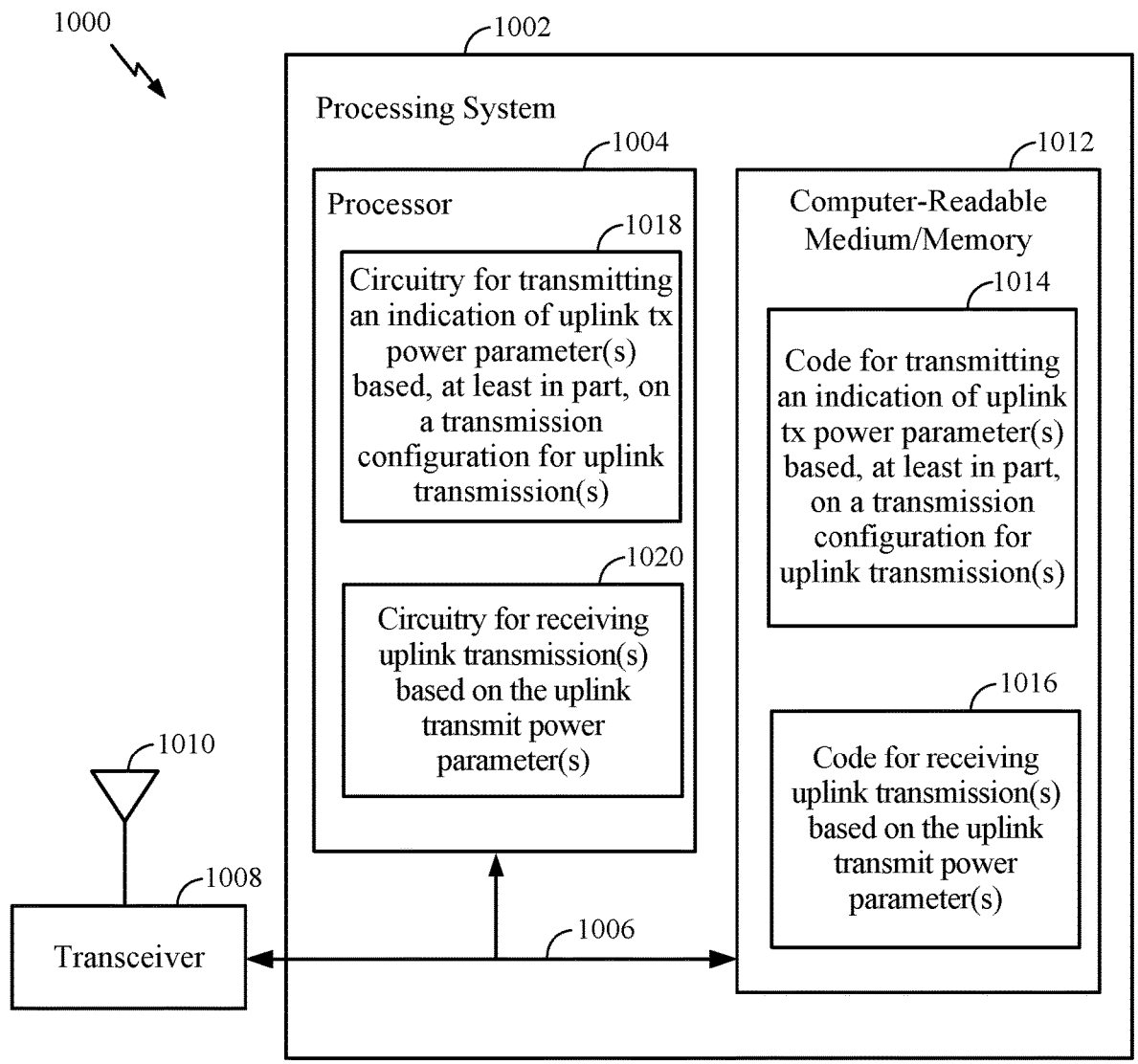
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008. The transceiver 1008 is configured to transmit and receive signals for the communications device 1000 via an antenna 1010, such as the various signals as described herein, for example, receiving uplink transmissions. The processing system 1002 may be configured to perform processing functions for the communications device 1000, including processing signals received and/or to be transmitted by the communications device 1000, such as interference control for uplink transmissions.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein for interference control for uplink transmission. In certain aspects, computer-readable medium/memory 1012 stores code 1014 for transmitting an indication to a UE of one or more uplink transmit power parameters in a message, the one or more uplink transmit power parameters being based, at least in part, on a transmission configuration of one or more uplink transmissions; and code 1016 for receiving the one or more uplink transmissions from the UE, the one or more uplink transmissions being transmitted by the UE based on the one or more uplink transmit power parameters, in accordance with aspects of the present disclosure. In certain aspects, the processor 1004 has circuitry configured to implement the code stored in the computer-readable medium/memory 1012. The processor 1004 includes circuitry 1018 for transmitting an indication to a UE of one or more uplink transmit power parameters in a message, the one or more uplink transmit power parameters being based, at least in part, on a transmission configuration of one or more uplink transmissions; and circuitry 1020 for receiving the one or more uplink transmissions from the UE, the one or more uplink transmissions being transmitted by the UE based on the one or more uplink transmit power parameters, in accordance with aspects of the present disclosure.

Example Aspects

In a first example aspect, a method for wireless communication by a user equipment (UE) includes determining a transmit power for one or more uplink transmissions to a base station (BS) using one or more transmit power parameters, the one or more transmit power parameters being based, at least in part, on a transmission configuration of the one or more uplink transmissions; and transmitting the one or more uplink transmissions to the BS using the determined transmit power.

In a second example aspect, in combination with the first example aspect, the transmission configuration comprises an antenna array, a beam, or a combination thereof, used for the one or more uplink transmissions.

In a third example aspect, in combination with one or more of the first or second example aspects, the one or more transmit power parameters comprise an alpha adjustment parameter, and wherein the alpha adjustment parameter is based, at least in part, on the transmission configuration of the one or more uplink transmissions.

In a fourth example aspect, in combination with one or more of the first through third example aspects, the transmit power is determined based on a closed-loop power control algorithm using the one or more transmit power parameters.

In a fifth example aspect, in combination with one or more of the first through fourth example aspects, the closed-loop power control algorithm is based on a minimum of a maximum uplink transmit power capability of the UE and a sum of a target power level, a bandwidth parameter, the alpha parameter adjustment to a pathloss parameter, a modulation and coding scheme (MCS) parameter, and a transmit power command parameter.

In a sixth example aspect, in combination with one or more of the first through fifth example aspects, the alpha adjustment parameter is further based on a level of interference or potential interference to one or more neighbor BSs caused by transmission from the UE using the transmission configuration.

In a seventh example aspect, in combination with one or more of the first through sixth example aspects, the UE determines the level of interference or potential interference based on one or more measurements or feedback from the BS or the one or more neighbor BSs.

In an eighth example aspect, in combination with one or more of the first through seventh example aspects, for concurrent uplink transmissions using multiple transmission configurations, the UE uses a first transmit power parameter for one or more first transmission configurations causing less interference or potential interference to neighboring BSs than one or more second transmission configurations; and uses a second transmit power parameter for the one or more second transmission configurations causing more interference to neighboring BSs than the one or more first transmission configurations, wherein the first transmit power parameter is higher than the second transmit power parameter.

In a ninth example aspect, in combination with one or more of the first through third eighth aspects, the UE receives an indication of the one or more transmit power parameters from the BS.

In a tenth example aspect, in combination with one or more of the first through ninth example aspects, the UE measures one or more reference signals from one or more BSs; and determines the one or more transmit power parameters based on the measurements.

In an eleventh example aspect, in combination with one or more of the first through tenth example aspects, determining the one or more transmit power parameters is based on a mapping or a formula using the measurements.

In a twelfth example aspect, in combination with one or more of the first through eleventh example aspects, the UE determines a potential interference level of the one or more uplink transmissions to the one or more BSs, a direction of the one or more uplink transmissions with respect to the one or more BSs, or both based on the measurements.

In a thirteenth example aspect, a method for wireless communication by a base station (BS), includes transmitting an indication of one or more uplink transmit power parameters to a user equipment (UE) in a message, wherein the one or more uplink transmit power parameters are based, at least in part, on a transmission configuration of one or more uplink transmissions; and receiving the one or more uplink transmissions from the UE, the one or more uplink transmissions being transmitted from the UE based on the one or more uplink transmit power parameters.

In a fourteenth example aspect, in combination with the thirteenth example aspect, the transmission configuration comprises an antenna array, a beam, or a combination thereof, of the one or more uplink transmissions.

In a fifteenth example aspect, in combination with one or more of the thirteenth or fourteenth example aspects, the BS communicates with one or more neighbor BSs to determine the one or more uplink transmit power parameters.

In a sixteenth example aspect, in combination with one or more of the thirteenth through fifteenth example aspects, communicating with the one or more neighbor BSs to determine the one or more transmit power parameters comprises: communicating with the one or more neighbor BSs to determine a level of interference or a potential level of interference to the one or more neighbor BSs caused by transmission from the UE using the transmission configuration; and determining the one or more uplink transmit power parameters based on the determined level of interference or potential interference.

In a seventeenth example aspect, in combination with one or more of the thirteenth through sixteenth example aspects, for concurrent uplink transmissions using multiple transmission configurations, the indication comprises: an indication of a first uplink transmit power parameter for one or more first transmission configurations causing less interference or potential interference to one or more neighboring BSs than a second one or more transmission configurations; and an indication of a second uplink transmit power parameter for the one or more second transmission configurations causing more interference to one or more neighboring BSs than the first one or more transmission configurations, wherein the first uplink transmit power parameter is higher than the second uplink transmit power parameter.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G NR), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (SGTF). 3GPP LTE and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In an LTE or LTE-A network, a set of one or more B Ss may define an eNodeB (eNB). In other examples (e.g., in 5G NR), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to BS or DU). In 3GPP, the term "cell" can refer to a coverage area of a NB and/or a NB subsystem serving this coverage area, depending on the context in which the term is used. In NR systems, the term "cell" and gNB, gNodeB, access point (AP), or TRP may be interchangeable.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum),In some examples, access to the air interface may be scheduled.

A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 6 and FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   determining a transmit power for one or more uplink transmissions to a base station (BS) based on a closed-loop power control algorithm that determines the transmit power as a minimum of: a maximum uplink transmit power capability of the UE and a sum of a target power level, a bandwidth parameter, a product of an alpha adjustment parameter and a pathloss parameter, and a transmit power command parameter, the alpha adjustment parameter being based, at least in part, on an antenna array, a beam, or a combination thereof used for the one or more uplink transmissions;
   measuring one or more reference signals from one or more BSs;
   determining the alpha adjustment parameter based on the measurements; and
   transmitting the one or more uplink transmissions to the BS using the determined transmit power.

2. The method of claim 1, further comprising determining a level of interference or potential interference to one or more neighbor BSs based on one or more measurements or feedback from the BS or the one or more neighbor BSs.

3. The method of claim 1, wherein:
   determining the alpha adjustment parameter comprises:
      determining a first alpha parameter for one or more first uplink transmissions using a first antenna array or beam causing less interference or potential interference to neighboring BSs than one or more second uplink transmissions using a second antenna array or beam; and
      determining a second alpha parameter for the one or more second uplink transmissions using the second antenna array or beam causing more interference or potential interference to neighboring BSs than the one or more first uplink transmissions using the first antenna array or beam;
   the first alpha parameter is higher than the second alpha parameter; and
   the one or more first uplink transmissions and the one or more second uplink transmissions comprise concurrent uplink transmissions using multiple antenna arrays or beams.

4. The method of claim 1, wherein determining the alpha adjustment parameter is based on a mapping or a formula using the measurements.

5. The method of claim 1, further comprising determining a level of interference or potential interference to the one or more BSs, a direction of the one or more uplink transmissions with respect to the one or more BSs, or both based on the measurements.

6. The method of claim 1, wherein the alpha adjustment parameter is based on an antenna panel index or a beam index.

7. An apparatus for wireless communication, comprising:
a memory; and
at least one processor coupled with the memory, the processor and memory configured to:
determine a transmit power for one or more uplink transmissions to a base station (BS) based on a closed-loop power control algorithm that determines the transmit power as a minimum of: a maximum uplink transmit power capability of a user equipment (UE) and a sum of a target power level, a bandwidth parameter, a product of an alpha adjustment parameter and a pathloss parameter, and a transmit power command parameter, the alpha adjustment parameter being based, at least in part, on an antenna array, a beam, or a combination thereof used for the one or more uplink transmissions;
measure one or more reference signals from one or more BSs;
determine the alpha adjustment parameter based on the measurements; and
transmit the one or more uplink transmissions to the BS using the determined transmit power.

8. The apparatus of claim 7, wherein the processor and memory are further configured to determine a level of interference or potential interference to one or more neighbor BSs based on one or more measurements or feedback from the BS or the one or more neighbor BSs.

9. The apparatus of claim 7, wherein:
the processor and memory being configured to determine the alpha adjustment parameter comprises the processor and memory being configured to:
determine a first alpha parameter for one or more first uplink transmissions using a first antenna array or beam causing less interference or potential interference to neighboring BSs than one or more second uplink transmissions using a second antenna array or beam; and
determine a second alpha parameter for the one or more first second transmissions using the second antenna array or beam causing more interference or potential interference to neighboring BSs than the one or more first uplink transmissions using the first antenna array or beam;
the first alpha parameter is higher than the second alpha parameter; and
the one or more first uplink transmissions and the one or more second uplink transmissions comprise concurrent uplink transmissions using multiple transmission configurations.

10. The apparatus of claim 7, wherein the alpha adjustment parameter is based on an antenna panel index or a beam index.

11. The apparatus of claim 7, wherein the processor and memory are configured to determine the alpha adjustment parameter based on a mapping or a formula using the measurements.

12. The apparatus of claim 7, wherein processor and memory are configured to determine a level of interference or potential interference to the one or more BSs, a direction of the one or more uplink transmissions with respect to the one or more BSs, or both based on the measurements.

13. An apparatus for wireless communication, comprising:
means for determining a transmit power for one or more uplink transmissions to a base station (BS) based on a closed-loop power control algorithm that determines the transmit power as a minimum of: a maximum uplink transmit power capability of the apparatus and a sum of a target power level, a bandwidth parameter, a product of an alpha adjustment parameter and a pathloss parameter, and a transmit power command parameter, the alpha adjustment parameter being based, at least in part, on an antenna array, a beam, or a combination thereof used for the one or more uplink transmissions;
means for measuring one or more reference signals from one or more BSs;
means for determining the alpha adjustment parameter based on the measurements; and
means for transmitting the one or more uplink transmissions to the BS using the determined transmit power.

14. The apparatus of claim 13, wherein the alpha adjustment parameter is based on an antenna panel index or a beam index.

15. The apparatus of claim 13, further comprising:
means for determining a level of interference or potential interference to one or more neighbor BSs based on one or more measurements or feedback from the BS or the one or more neighbor BSs.

16. The apparatus of claim 13, wherein:
the means for determining the alpha adjustment parameter comprises:
means for determining a first alpha parameter for one or more first uplink transmissions using a first antenna array or beam causing less interference or potential interference to neighboring BSs than one or more second uplink transmissions using a second antenna array or beam; and
means for determining a second alpha parameter for the one or more second uplink transmissions using the second antenna array or beam causing more interference or potential interference to neighboring BSs than the one or more first uplink transmissions using the first antenna array or beam;
the first alpha parameter is higher than the second alpha parameter; and
the one or more first uplink transmissions and the one or more second uplink transmissions comprise concurrent uplink transmissions using multiple antenna arrays or beams.

17. The apparatus of claim 13, wherein determining the alpha adjustment parameter is based on a mapping or a formula using the measurements.

18. The apparatus of claim 13, further comprising:
means for determining a level of interference or potential interference to the one or more BSs, a direction of the one or more uplink transmissions with respect to the one or more BSs, or both based on the measurements.

19. A non-transitory computer readable medium storing computer executable code thereon for wireless communication, comprising:
code for determining a transmit power for one or more uplink transmissions to a base station (BS) based on a closed-loop power control algorithm that determines the transmit power as a minimum of: a maximum uplink transmit power capability of a user equipment (UE) and a sum of a target power level, a bandwidth parameter, a product of an alpha adjustment parameter and a pathloss parameter, and a transmit power command parameter, the alpha adjustment parameter being based, at least in part, on an antenna array, a beam, or a combination thereof used for the one or more uplink transmissions;

code for measuring one or more reference signals from one or more BSs;

code for determining the alpha adjustment parameter based on the measurements; and code for transmitting the one or more uplink transmissions to the BS using the determined transmit power.

20. The non-transitory computer readable medium of claim 19, wherein the alpha adjustment parameter is based on an antenna panel index or a beam index.

21. The non-transitory computer readable medium of claim 19, further comprising:

code for determining a level of interference or potential interference to one or more neighbor BSs based on one or more measurements or feedback from the BS or the one or more neighbor BSs.

22. The non-transitory computer readable medium of claim 19, wherein:

the code for determining the alpha adjustment parameter comprises:

code for determining a first alpha parameter for one or more first uplink transmissions using a first antenna array or beam causing less interference or potential interference to neighboring BSs than one or more second uplink transmissions using a second antenna array or beam; and code for determining a second alpha parameter for the one or more second uplink transmissions using the second antenna array or beam causing more interference or potential interference to neighboring BSs than the one or more first uplink transmissions using the first antenna array or beam;

the first alpha parameter is higher than the second alpha parameter; and the one or more first uplink transmissions and the one or more second uplink transmissions comprise concurrent uplink transmissions using multiple antenna arrays or beams.

23. The non-transitory computer readable medium of claim 19, wherein determining the alpha adjustment parameter is based on a mapping or a formula using the measurements.

24. The non-transitory computer readable medium of claim 19, further comprising:

code for determining a level of interference or potential interference to the one or more BSs, a direction of the one or more uplink transmissions with respect to the one or more BSs, or both based on the measurements.

* * * * *